(12) United States Patent
DeClerck et al.

(10) Patent No.: US 6,198,937 B1
(45) Date of Patent: Mar. 6, 2001

(54) METHOD AND APPARATUS FOR CONTROLLING RADIO LINK CAPACITY IN A COMMUNICATION SYSTEM

(75) Inventors: Daniel Joseph DeClerck, Algonquin; Stephen Spear, Skokie; Keith Allen TenBrook, Cary, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/296,960

(22) Filed: Apr. 22, 1999

(51) Int. Cl.[7] .................................................. H04Q 7/20
(52) U.S. Cl. ............................................. 455/517; 453/426
(58) Field of Search ................................. 455/436, 426, 455/553, 422, 552, 437, 438, 439, 442, 500, 513, 515, 67.1, 517, 524, 523, 5.1

(56) References Cited

U.S. PATENT DOCUMENTS

| | | | |
|---|---|---|---|
| 5,226,045 | * | 7/1993 | Chuaung ................. 370/332 |
| 5,594,726 | * | 1/1997 | Thompson et al. ......... 370/485 |
| 5,606,725 | * | 2/1997 | Hart .................... 455/5.1 |
| 5,623,422 | * | 4/1997 | Williams ................ 364/514 |
| 5,794,148 | * | 8/1998 | Mamaghani et al. ........ 455/435 |
| 5,862,451 | * | 1/1999 | Grau et al. .............. 455/5.1 |
| 5,887,260 | * | 3/1999 | Nakata .................. 455/436 |
| 5,901,354 | * | 5/1999 | Menich et al. ........... 455/442 |
| 5,930,712 | * | 7/1999 | Byrne et al. ............ 455/437 |
| 5,949,771 | * | 9/1999 | DeClerck et al. ......... 370/331 |
| 5,999,815 | * | 12/1999 | TenBrook et al. ......... 455/436 |
| 6,035,183 | * | 3/2000 | Todd et al. ............. 455/226.2 |

* cited by examiner

Primary Examiner—Dwayne D. Bost
Assistant Examiner—Joy Redmon

(57) ABSTRACT

A method and apparatus is provided that includes equipment for controlling radio link capacity of each of the plurality of compatible radio transmission technologies (112), and equipment (113) for controlling the equipment for controlling radio link capacity of each of the plurality of compatible radio transmission technologies (112) based on a quality metric report (114) that includes information about a quality of radio link between at least one of a plurality of mobile stations and a base station, which provide a global control that effects the way independent equipment (110) and (111) control radio link capacities of their respective transmission technologies.

24 Claims, 3 Drawing Sheets

METHOD AND APPARATUS FOR CONTROLLING RADIO LINK CAPACITY IN A COMMUNICATION SYSTEM

FIELD OF THE INVENTION

The invention relates generally to wireless communication systems and more particularly to capacity and communication traffic control in such wireless communication systems.

BACKGROUND OF THE INVENTION

Cellular communication systems are well known, and are evolving to meet higher communication capacity requirements as more people are adopting cellular communication system for their everyday communication needs. For example, one communication system, which has evolved from a communication system operating according to the well-known IS-95A standard, is commonly referred to as the CDMA 2000communication system. The IS-95A and CDMA 2000 communication systems operate according to their transmission technologies defined by respectively IS-95A and CDMA2000 standards. The IS-95A and CDMA2000 systems are compatible systems. Other systems compatible with one or more of the existing systems, such as Wide Band CDMA (WCDMA) system, are also being proposed and implemented. Such compatible communication systems are being proposed or implemented at the time of filing this application. Therefore, the extend of the systems compatibility may change in future without departing from the basic compatibility requirements. In the CDMA 2000 communication system, for example, layer 2 and above messaging/signaling can be compatible with the IS-95A communication system; however, the air-interface may be different between the communication systems. Therefore, the two systems have compatible radio transmission technologies even though they have differences in operation.

The systems that are based on IS-95A transmission technology are older systems and have been implemented and in use in many regions of the world. The CDMA 2000 and WCDMA system are new systems. Such new systems are implemented in an overlay fashion in the areas covered by the older and compatible systems. As such, the capacity of the system consisted of the older and new systems is increased which allows more people to communicate via the cellular technology in the same area. A mobile unit compatible with both systems may communicate via radio transmission technology of either system. The base stations of the compatible systems provide the wireless and wireline landbased connections. Such base stations may be co-located or in proximity of each other. To a user of the system, the base stations appear as a single base station having compatible radio transmission technologies. It may be transparent to the user as to which technology is being used by her mobile station while in operation.

There may be three types of mobile stations. The first type communicates only according to the older transmission technology, the second type according to the new transmission technology, and the third type according to the old or the new type of transmission technology. The third type is commonly referred to as a dual mode mobile station. The dual mode mobile station may be capable of hand-off between the transmission technologies while a call is in progress with the base station. In case there are three compatible systems in a geographic area, a mobile station may be of tri-mode, which can operate in any of the three systems; as a result, there may be more than three types of mobile stations. A method and apparatus for implementing diversity for a dual-mode communication unit are described in an application for a patent by Ten-Brook et al, having at least one common inventor with the present application, App. No. 09/111,974,filed on Jul. 8, 1998, in the United States Patent Office, and assigned to the assignee of the present application, incorporated by reference herein.

The base station, normally, has limited radio link capacity of each of the compatible radio transmission technologies. The radio link capacity may be limited by either the amplifier maximum linear gain, which is amplifying the composite signal, or the number of channel elements that provide resources for the radio links in the system or both the amplifier and channel elements. For example, when the radio link capacity of the older transmission technology reaches near its limit, the base station may refuse communication service to a mobile station that works only according to the older transmission technology, similarly, base station may refuse service to a mobile station that works only according to the new transmission technology if the radio link capacity of the new technology reaches near its limit. The dual mode mobile stations that work in both types of technologies may receive communication service as long the base station has a radio link capacity available in either one of the radio transmission technologies.

There is no independent control of the number of mobile stations roaming into and out of the coverage area. Furthermore, there is no independent control of the ratios of the old, new and dual mode mobile stations present in a coverage area. As a result, there may be a situation that the base station has an available radio link capacity, for example, in the new transmission technology while the available capacity in the older technology is being used to its limit by the older type mobile stations and dual mode mobile stations using the older type transmission. The exhaustion of the radio link capacity of the older type transmission technology, when effecting the dual mode mobile stations, may be solved simply by handing off some of the dual mode mobile stations from the old to the new transmission technology; however, there is no independent control of balancing availability of radio link capacity of the old and new transmission technologies for all types of mobile stations when both transmission technologies are made available in a coverage area.

Therefore, there is a need for a method and apparatus for controlling capacity and communication traffic in such wireless communication systems.

DETAILED DESCRIPTION OF THE PREFERRED EMBODIMENT(S)

Figure 1:
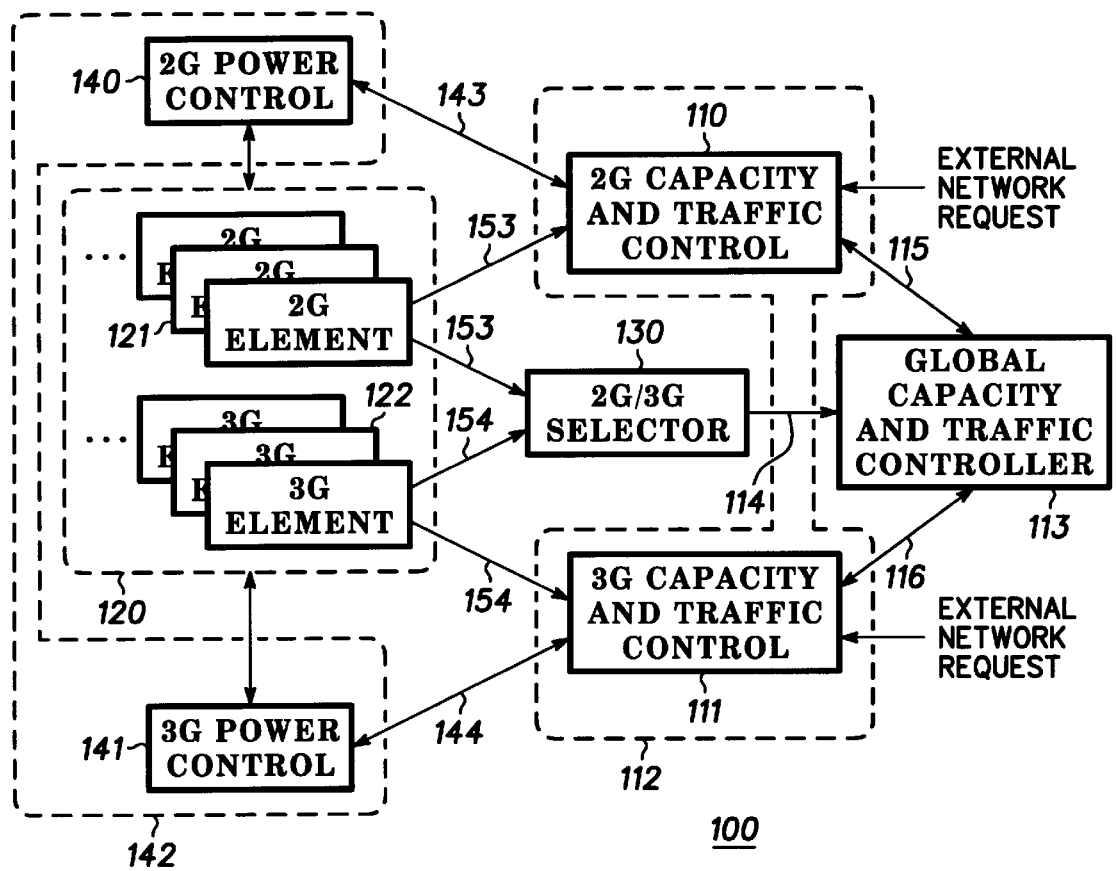
FIG. 1 depicts a conceptual partition of various blocks within a communication system operating according to various aspects of the invention.

According to one or more aspects of the invention the problem of controlling radio link capacity in a communication system is solved. Various aspects of the invention are shown by way of referencing to FIG. 1, a block diagram 100. Block diagram 100 depicts a conceptual partition of various blocks within a communication system operating according to various aspects of the invention. The partitions are shown to facilitate description of the invention. The blocks may be implemented by a way of software, hardware, or combination of hardware and software. Such implementations are well known.

A communication system may provide communication services between a plurality of mobile stations and a base station through a plurality of radio links that may include a plurality of forward radio links and a plurality of reverse radio links. The radio links are transmitted according to a plurality of compatible radio transmission technologies. The base station may have a limited radio link capacity of each of the plurality of compatible radio transmission technologies.

An apparatus in the communication system according to an embodiment of the invention may include means for controlling radio link capacity of each of the plurality of compatible radio transmission technologies 112, and means 113 for controlling the means for controlling radio link capacity of each of the plurality of compatible radio transmission technologies 112 based on a quality metric report 114 that includes information about a quality of radio link between at least one of the plurality of mobile stations and the base station. The means 113 for controlling the means for controlling radio link capacity of each of the plurality of compatible radio transmission technologies 112 may also be called global capacity controller 113. Accordingly, controlling radio link capacity of each of the plurality of compatible radio transmission technologies in means for controlling radio link capacity of each of the plurality of compatible radio transmission technologies 112 based on quality metric report 114 through global capacity controller 113 provides that the radio link capacity of the plurality of compatible radio transmission technologies are adequately being used without over-utilization of one type and under-utilization of another, thus, providing a balanced utilization of radio link resources.

The means for controlling radio link capacity of each of the plurality of compatible radio transmission technologies 112 may include a number of independent means for controlling radio link capacity corresponding to a number of the plurality of compatible radio transmission technologies. For example, there may be two independent means 110 and 111 for controlling IS-95A and CDMA 2000 systems capacities, commonly refer to as 2G and 3G systems respectively to refer to them as the Second (2) and Third (3) Generation systems. The WCDMA system is considered a 3G system. The global capacity controller 113 has communications 115 and 116 with both independent means 110 and 111 respectively, which provide a global control that may effect the way independent means 110 and 111 control capacities of their respective transmission technologies. Such a global control, through communications 115 and 116, is based on quality of metric report 114 that may include information about quality of radio links communicated according to the transmission technologies.

The quality metric report 114 includes information about a quality of radio link between at least one of the plurality of mobile stations and the base station. The quality of the radio link may be used to control utilization of each type of radio transmission capacities. For example, if the quality metric report 114 indicates poor or inadequate performance of a radio link communicated according to a first type of transmission technology, the controller may attempt to handoff or establish new calls on a second transmission technology to relieve congestion and over-utilization of the first type of transmission technology.

The quality metric report 114 further may include information which identifies at least one of the plurality of radio links and at least one of the plurality of transmission technologies that is being used for transmission of the identified radio link. The quality metric report 114 may include information about frame error rate or symbol error rate metric of at least one of the plurality of radio links. A radio link may be partitioned to be a froward radio link from the base station to the mobile station, and a reverse radio link from the mobile station to the base station. Therefore, the least one of the plurality of radio links identified in the quality metric report 114 may be at least one of the plurality of reverse radio links communicated between the base station and a mobile station.

The system normally has a hand-off routine that is utilized when the system detects degradation of a radio link quality. The hand-off may be in a form of soft or hard hand-off. Methods of performing hand-offs are well known, and are normally implemented according to one or more communication standards. Since a request for hand-off may be an indication of poor or inadequate quality of a radio link, the quality metric report 114 may include information about a request for hand-off, made in connection with at least one of the plurality of radio links. The hand-off request may be for hand-off of the radio link between the plurality of transmission technologies. If the request for hand-off is granted by the system, the quality metric report 114 may include information about a selected transmission technology that is granted based on the request for hand-off.

The communication system may include means for a plurality of channel elements 120 of a plurality of types 121 and 122 corresponding to the plurality of radio transmission technologies. Normally, a communication system has a limited number of the plurality of channel elements 121 and 122. For example, the plurality of channel elements 121 provides communication resources for 2G-transmission technology, and similarly, the plurality of channel elements 122 for 3G-transmission technology. Each channel element provides resource for radio transmission of a radio link. The channel element may include hardware and software resources. The communication system may further include means for reporting 130 the quality metric report 114 based on information 153 and 154 received from the means for the plurality of channel elements 120 of the plurality of types 121 and 122. Such information may include the number and the type of channel elements that are being used for maintaining the plurality of the radio links, as well as frame error rate and symbol error rate of the radio links.

The communication system may include means for controlling transmission power level 142 of the radio links. Radio link capacity is directly related to power level of each radio link in code division multiple access communication systems. The IS-95 and CDMA2000 are based on code division multiple access technology. The system capacity is dependent on the maximum capacity of the system to amplify the combined signal. The system capacity therefore is dependent on the power level of individual radio links signals forming the combined signal.

The power level of the radio link transmissions may be controlled by the means for controlling transmission power level 142 which may include means for power control 140, for 2G system, and 141, for 3G system, for example. Such power level control may be based on communications 143 and 144 between the means for controlling radio link capacity of each of the plurality of compatible radio transmission technologies 112 and the means for controlling transmission power level 142. The communications 143 and 144 may include information about a frame error rate threshold of the radio links. The communications 143 and 144 further may include information about an adjustment of a radio link transmission power level which may be based on the frame error rate threshold. The communications 143 and 144 further includes information about transmit power-setting information and power increase requests for the plurality of radio links. The power control of the radio links by 2G and 3G power controls 140 and 141 are based on information received from respectively communications 143 and 144. The information carried by communications 143 and 144 are based on information received from communications 153 and 154 respectively in addition to the information received through communications 115 and 116 from global capacity controller 113. As such, the global capacity controller 113 controls the power control operations of power controls 140 and 141, and thus, directly controlling radio link capacity of the communication system. Such control may be in the form of changing power increase request and frame error thresholds of the radio links.

According to various aspects of the invention, global capacity controller 113 may control radio link capacity and communication traffic of each type of the transmission technologies by incorporating an algorithm through software or hardware implementation that takes advantage of the information received by the quality metric report 114 and the communications 115 and 116. Various aspects of the algorithm are shown by way of reference to FIGS. 2 and 3.

Figure 2:
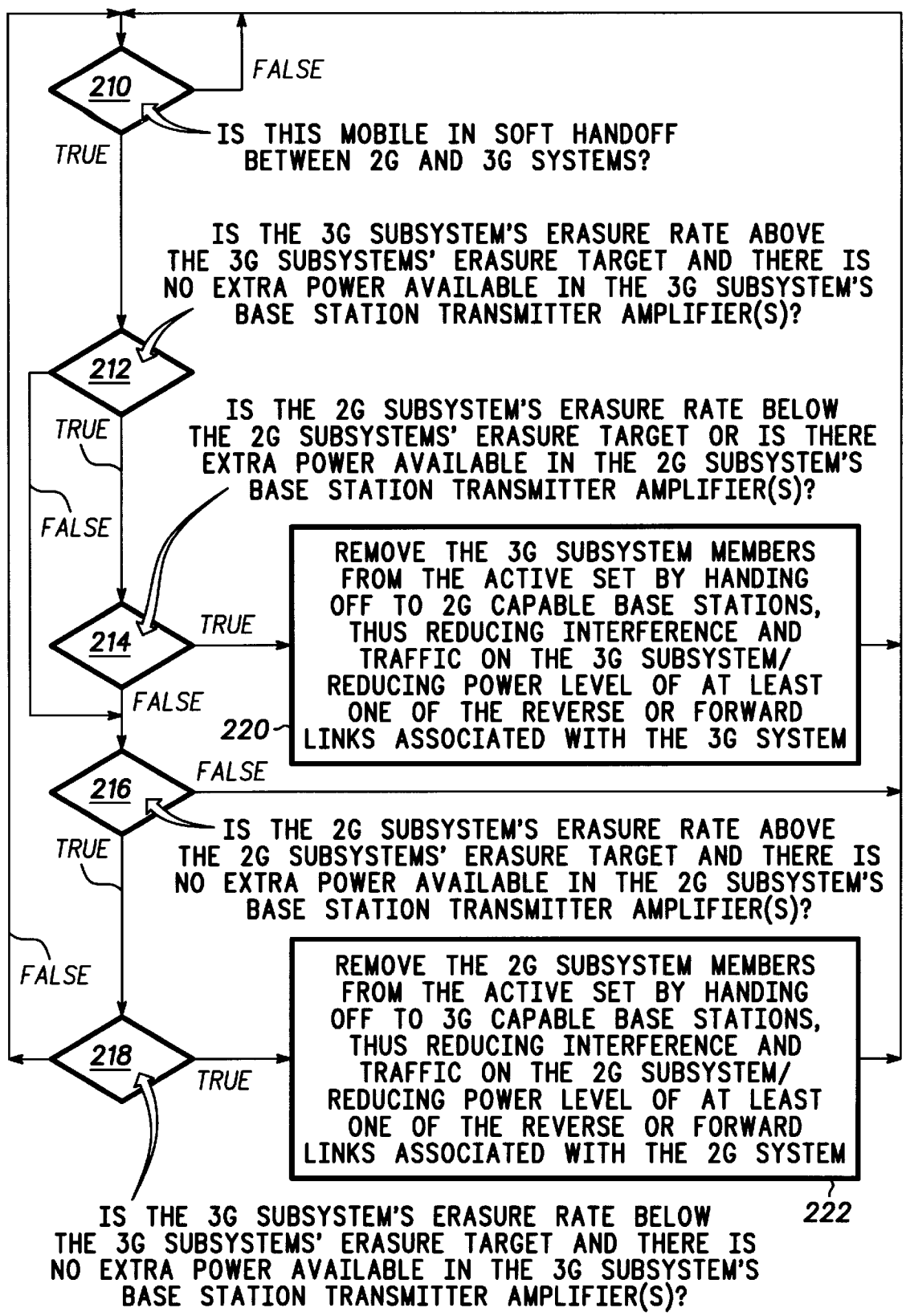
FIG. 2 shows a flow chart of an algorithm for controlling radio link capacity of types of radio transmission technologies in a communication system according to various aspects of the invention.
Figure 3:
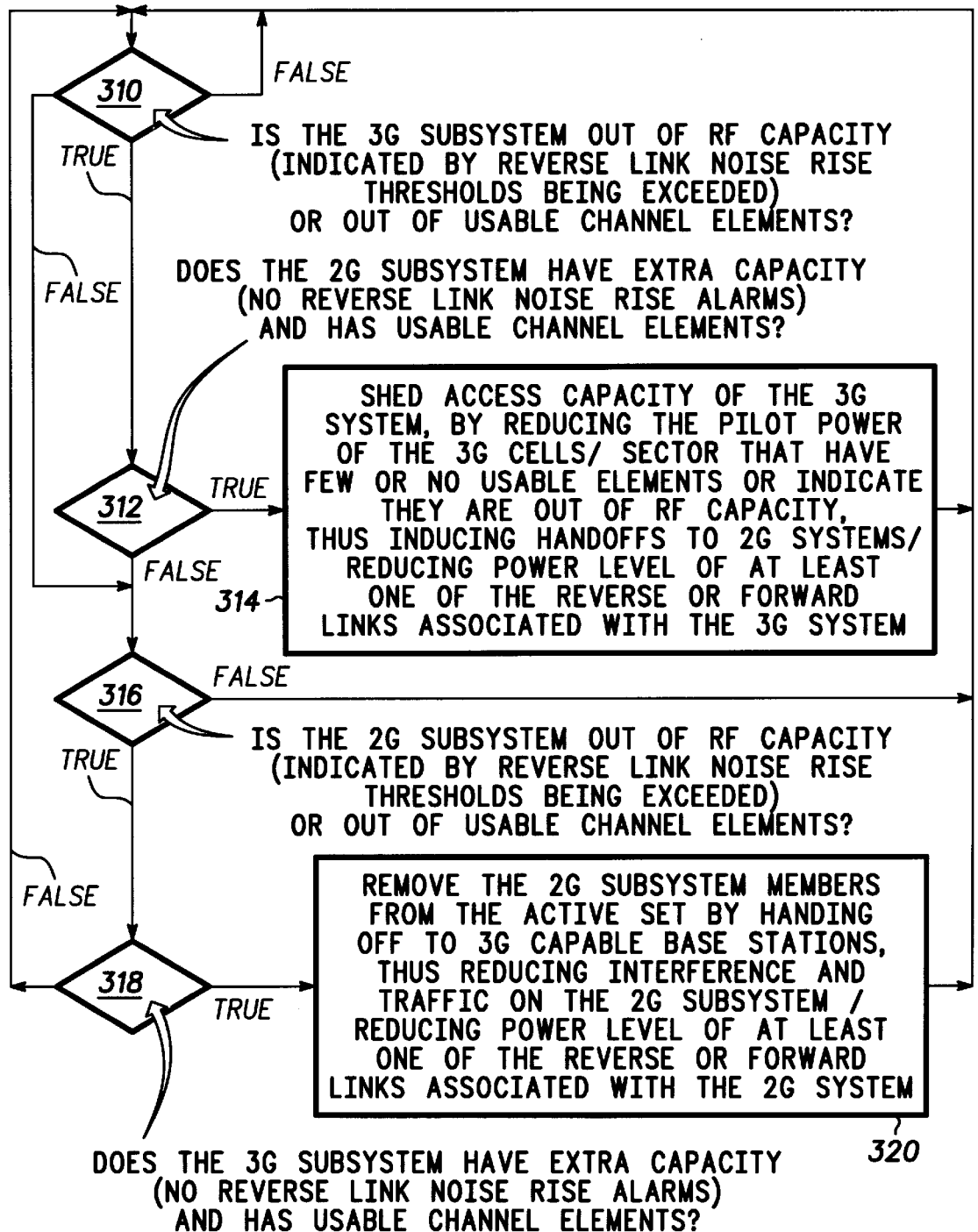
FIG. 3 shows a flow chart of an algorithm for controlling radio link capacity of types of radio transmission technologies in a communication system according to various aspects of the invention.

FIG. 2 shows a flow chart for controlling radio link capacity of each type of the radio transmission technologies by taking into consideration individual radio link performance. FIG. 3 shows a flow chart for controlling radio link capacity of each type of the radio transmission technologies by taking into consideration an aggregate performance of the types of radio transmission technologies.

A communication system may provide communication services between a plurality of mobile stations and a base station through a plurality of radio links including a plurality of forward radio links and a plurality of reverse radio links transmitted according to a plurality of compatible radio transmission technologies. The base station may have a limited radio link capacity of each of the plurality of compatible radio transmission technologies. A method, according to various aspects of the invention, for controlling the limited radio link capacity of each of the plurality of compatible radio transmission technologies may includes one or more of the following steps:

At a Step 210, determining whether a mobile station of the plurality of mobile stations having a radio link of a first type, for example of 3G type, of the plurality of transmission technologies is in a hand-off to a second type, for example of 2G type, of the plurality of transmission technologies, and if determining in the step 210 is negative, continue repeating the step 210;

At a step 212, determining whether a first (3G) frame erasure rate associated with the first (3G) type of the plurality of transmission technologies is above a first (3G) predetermined frame erasure rate target that is associated with the first (3G) type of the plurality of transmission technologies, and whether additional amplifying power is unavailable from a first (3G) amplifier amplifying radio links associated with the first (3G) type of the plurality of transmission technologies;

At a step 214, determining whether a second (2G) frame erasure rate associated with the second (2G) type of the plurality of transmission technologies is below a second (2G) predetermined frame erasure rate target associated with the second (2G) type of the plurality of transmission technologies, or whether additional amplifying power is available from a second (2G) amplifier amplifying radio links associated with the second (2G) type of the plurality of transmission technologies;

At a step 220, removing, if the determining in the steps 212 and 214 are positive, a first (3G) plurality of active radio links of the first (3G) type of the plurality of transmission technologies, and handing-off the removed first (3G) plurality of active radio links of the first (3G) type to the second (2G) type, thereby, reducing communication traffic associated with the first (3G) type of the plurality of transmission technologies, and continue repeating step 210;

At a step 216, determining whether the second (2G) frame erasure rate associated with the second (2G) type of the plurality of transmission technologies is above the second (2G) predetermined frame erasure rate target that is associated with the second (2G) type of the plurality of transmission technologies, and whether additional amplifying power is unavailable from the second (2G) amplifier amplifying radio links associated with the second (2G) type of the plurality of transmission technologies, and if determining in the step 216 is negative, continue repeating step 210;

At a step 218, determining whether the first (3G) frame erasure rate associated with the first (3G) type of the plurality of transmission technologies is below the first (3G) predetermined frame erasure rate target that is associated with the first (3G) type of the plurality of transmission technologies, or whether additional amplifying power is available from the first (3G) amplifier amplifying radio links associated with the first (3G) type of the plurality of transmission technologies;

At a step 222, removing, if determining in the steps 216 and 218 are positive, a second (2G) plurality of active radio links of the second (2G) type of the plurality of transmission technologies, and handing-off the removed second (2G) plurality of active radio links of the second (2G) type to the first (3G) type, thereby, reducing communication traffic associated with the second (2G) type of the plurality of transmission technologies and continue repeating the step 210, and if determining in the step 216 is positive or in the step 218 is negative, repeating the step 210.

According to various aspect of the invention shown by way of a flow chart depicted in FIG. 3, a method for controlling radio link capacity of each type of the radio transmission technologies by taking into consideration an aggregate performance of the types of radio transmission technologies may includes one or more of the following steps:

At a step 310, determining whether a first (3G) reverse link noise level associated with a first (3G) reverse radio link of the plurality of reverse links of a first (3G) type of the plurality of transmission technologies exceeds a first (3G) reverse link noise threshold associated with the plurality of reverse links of the first (3G) type of the plurality of transmission technologies, or whether a first (3G) channel element of the first (3G) type of the plurality of transmission technologies is unavailable;

At a step 312, determining whether a second (2G) reverse link noise level associated with a second (2G) reverse link of the plurality of reverse links of a second (2G) type of the plurality of transmission technologies is below a second (2G) reverse link noise threshold associated with the plurality of reverse links of the second (2G) type of the plurality of transmission technologies, and whether a second (2G) channel element of the second (2G) type of the plurality of transmission technologies is available;

At a step 314, reducing, if the determining in the steps 310 and 312 are positive, power level of a first (3G) pilot signal associated with the first (3G) type of the plurality of transmission technologies, thereby, inducing hand-off of one or more radio links of the first (3G) type of the plurality of transmission technologies to the second (2G) type of the plurality of transmission technologies and continue repeating the step 310;

At a step 316, determining whether the second (2G) reverse link noise level associated with the second (2G) reverse radio link of the plurality of reverse links of the second (2G) type of the plurality of transmission technologies exceeds the second (2G) reverse link noise threshold associated with the plurality of reverse links of the second (2G) type of the plurality of transmission technologies, or whether the second (2G) channel element of the second (2G) type of the plurality of transmission technologies is unavailable;

At a step 318, determining whether the first (3G) reverse link noise level associated with the first (3G) reverse link of said plurality of reverse links of the first (3G) type of the plurality of transmission technologies is below the first (3G) reverse link noise threshold associated with the plurality of reverse links of the first (3G) type of the plurality of transmission technologies, and whether the first (3G) channel element of the first (3G) type of the plurality of transmission technologies is available;

At a step 320, removing, if the determining in the steps 316 and 318 are positive, a plurality of active radio links of the first (3G) type of the plurality of transmission technologies from an active set associated with the first (3G) type of the plurality of transmission technologies and handing-off the removed plurality of active radio links of the first (3G) type to the second (2G) type of radio links of the plurality of transmission technologies, thereby, reducing communication traffic associated with the first (3G) type of the plurality of transmission technologies and repeating the step 310, and, if the determining in the step 316 or 318 is negative, repeating the step 310.

In an embodiment of the invention, steps 310 and 316 may be bypassed and the method begins at step 316. In this case, the method includes the following steps:

At step 316, determining whether a 2G reverse link noise level associated with a 2G reverse link of said plurality of reverse links of a 2G type of the plurality of transmission technologies is below a 2G reverse link noise threshold associated with the plurality of reverse links of the 2G type of the plurality of transmission technologies, and whether a 2G channel element of the 2G type of the plurality of transmission technologies is available;

At step 318, determining whether a 3G reverse link noise level associated with a 3G reverse radio link of the plurality of reverse links of a 3G type of the plurality of transmission technologies exceeds a 3G reverse link noise threshold associated with the plurality of reverse links of the 3G type of the plurality of transmission technologies, or whether a 3G channel element of the 3G type of the plurality of transmission technologies is unavailable; At step 320, removing, if the determining in the steps 316 and 318 are positive, a plurality of active radio links of the 3G type of the plurality of transmission technologies from an active set associated with the 3G type of the plurality of transmission technologies, and handing-off the removed plurality of active radio links of the 3G type to the 2G type of radio links of the plurality of transmission technologies, thereby, reducing communication traffic associated with the 2G type of the plurality of transmission technologies.

The invention may include a step of reducing power level of at least one of the plurality of reverse and forward radio links associated with, for example, the first type of the plurality of transmission technologies, thereby, reducing communication traffic associated with the first type of the plurality of transmission technologies, as such controlling the capacity. As a result of power reduction, other users may be added to the system.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed is:

1. In a communication system providing communication services between a plurality of mobile stations and a base station through a plurality of radio links including a plurality of forward radio links and a plurality of reverse radio links transmitted according to a plurality of compatible radio transmission technologies, and said base station having a limited radio link capacity of each of said plurality of compatible radio transmission technologies, an apparatus comprising:

means for controlling radio link capacity of each of said plurality of compatible radio transmission technologies;

means for controlling said means for controlling radio link capacity of each of said plurality of compatible radio transmission technologies based on a quality metric report including information about a quality of radio link between at least one of said plurality of mobile stations and said base station.

means for controlling transmission power level of a radio link of said plurality of radio links, wherein said radio link transmission power level controlled by said means for controlling transmission power level is based on a communication between said means for controlling radio link capacity and said means for controlling transmission power level, wherein said communication includes information about at least one of a frame error rate threshold, symbol error rate threshold, and noise rise of said radio link, and wherein an adjustment of said radio link transmission power level is based on at least one of a frame error rate threshold, symbol error rate threshold, and noise rise of said radio link, wherein said information in said communication between said means for controlling radio link capacity and said means for controlling transmission power level is at least in a part is based on information communicated from said means for controlling said means for controlling radio link capacity of each of said plurality of compatible radio transmission technologies.

2. The apparatus as claimed in claim 1 wherein said quality metric report includes information which identifies at least one of said plurality of radio links and at least one of said plurality of transmission technologies being used for transmission of said identified radio link.

3. The apparatus as claimed in claim 1 wherein said quality metric report includes information about frame error rate of at least one of said plurality of radio links.

4. The apparatus as claimed in claim 3 wherein said least one of said plurality of radio links is at least one of said plurality of reverse radio links.

5. The apparatus as claimed in claim 3 wherein said least one of said plurality of radio links is at least one of said plurality of forward radio links.

6. The apparatus as claimed in claim 1 wherein said quality metric report includes information about symbol error rate metric of at least one of said plurality of radio links.

7. The apparatus as claimed in claim 6 wherein said least one of said plurality of radio links is at least one of said plurality of reverse radio links.

8. The apparatus as claimed in claim 6 wherein said least one of said plurality of radio links is at least one of said plurality of forward radio links.

9. The apparatus as claimed in claim 1 wherein said quality metric report includes information about noise rise of at least one of said at least one of said plurality of radio links.

10. The apparatus as claimed in claim 9 wherein said least one of said plurality of radio links is at least one of said plurality of reverse radio links.

11. The apparatus as claimed in claim 1 wherein said quality metric report includes information about a request for hand-off, made in connection with at least one of said plurality of radio links, between said plurality of transmission technologies.

12. The apparatus as claimed in claim 11 wherein said quality metric report includes information about a selected transmission technology based on said request for hand-off.

13. The apparatus as claimed in claim 1 comprising: means for a plurality of channel elements of a plurality of types corresponding to said plurality of radio transmission technologies, wherein each of said plurality of channel elements provides resource for radio transmission of a radio link of said plurality of radio links.

14. The apparatus as claimed in claim 13 wherein at least one of said plurality of channel elements is of more than one of said plurality of types, and capable of providing resource for at least more than one said plurality of radio transmission technologies.

15. The apparatus as claimed in claim 13 comprising means for reporting said quality metric report based on information received from said means for said plurality of channel elements of said plurality of types.

16. The apparatus of claim 1 wherein said communication includes information about transmit power-setting information and power increase requests for said plurality of radio links.

17. The apparatus as claimed in claim 1 wherein said means for controlling radio link capacity of each of said plurality of compatible radio transmission technologies includes a number of independent means for controlling radio link capacity corresponding to a number of said plurality of compatible radio transmission technologies.

18. In a communication system providing communication services between a plurality of mobile stations and a base station through a plurality of radio links including a plurality of forward radio links and a plurality of reverse radio links transmitted according to a plurality of compatible radio transmission technologies, and said base station having a limited radio link capacity of each of said plurality of compatible radio transmission technologies, a method for controlling said limited radio link capacity of each of said plurality of compatible radio transmission technologies comprising the steps of:

a) determining whether a mobile station of the plurality of mobile stations having a radio link of a first type of the plurality of transmission technologies is in a hand-off to a second type of the plurality of transmission technologies, and if determining in the step (a) is negative, continue repeating the step (a);

b) determining whether a first frame erasure rate associated with the first type of the plurality of transmission technologies is above a first predetermined frame erasure rate target that is associated with the first type of the plurality of transmission technologies, and whether additional amplifying power is unavailable from a first amplifier amplifying radio links associated with the first type of the plurality of transmission technologies;

c) determining whether a second frame erasure rate associated with the second type of the plurality of transmission technologies is below a second predetermined frame erasure rate target associated with the second type of the plurality of transmission technologies, or whether additional amplifying power is available from a second amplifier amplifying radio links associated with the second type of the plurality of transmission technologies;

d) performing, if the determining in the steps (a), (b) and (c) are positive, at least one of:
  d1) removing a first plurality of active radio links of the first type of the plurality of transmission technologies, and handing-off the removed first plurality of active radio links of the first type to the second type, and
  d2) reducing power level of at least one of the plurality of reverse and forward radio links associated with the first type of the plurality of transmission technologies, repeating step (a) following at least one of the steps (d1) and (d2).

19. The method as recited in claim 18 further comprising the steps of:

(e) determining, if the determining in the steps (b) or (c) are negative, whether the second frame erasure rate associated with the second type of the plurality of transmission technologies is above the second predetermined frame erasure rate target that is associated with the second type of the plurality of transmission technologies, and whether additional amplifying power is unavailable from the second amplifier amplifying radio links associated with the second type of the plurality of transmission technologies, and if the determining in the step (e) is negative, continue repeating step (a);

(f) determining, if the determining in the step (e) is positive, whether the first frame erasure rate associated with the first type of the plurality of transmission technologies is below the first predetermined frame erasure rate target that is associated with the first type of the plurality of transmission technologies, or whether additional amplifying power is available from the first amplifier amplifying radio links associated with the first type of the plurality of transmission technologies;

(g) performing, if determining in the steps (e) and (f) are positive, at least one of:

(g1) removing a second plurality of active radio links of the second type of the plurality of transmission technologies, and handing-off the removed second plurality of active radio links of the second type to the first type, and (g2) reducing power level of at least one of the plurality of reverse and forward radio links associated with the second type of the plurality of transmission technologies;

repeating the step (a) if determining in the step (e) is positive or in the step (f) is negative, and following at least one of steps (g1) and (g2).

20. In a communication system providing communication services between a plurality of mobile stations and a base station through a plurality of radio links including a plurality of forward radio links and a plurality of reverse radio links transmitted according to a plurality of compatible radio transmission technologies, and said base station having a limited radio link capacity of each of said plurality of compatible radio transmission technologies, a method for controlling said limited radio link capacity of each of said plurality of compatible radio transmission technologies comprising the steps of:

(a) determining whether a first reverse link noise level associated with a first reverse radio link of the plurality of reverse links of a first type of the plurality of transmission technologies exceeds a first reverse link noise threshold associated with the plurality of reverse links of the first type of the plurality of transmission technologies, or whether a first channel element of the first type of the plurality of transmission technologies is unavailable;

(b) determining whether a second reverse link noise level associated with a second reverse link of the plurality of reverse links of a second type of the plurality of transmission technologies is below a second reverse link noise threshold associated with the plurality of reverse links of the second type of the plurality of transmission technologies, and whether a second channel element of the second type of the plurality of transmission technologies is available;

(c) performing, if the determining in the steps (a) and (b) are positive, at least one of:

(c1) reducing power level of a first pilot signal associated with the first type of the plurality of transmission technologies, thereby, inducing hand-off of one or more radio links of the first type of the plurality of transmission technologies to the second type of the plurality of transmission technologies, and (c2) reducing power level of at least one of the plurality of reverse and forward radio links associated with the first type of the plurality of transmission technologies;

repeating the step (a) at least following one of the steps (c1) and (c2).

21. The method as recited in claim 20 further comprising the steps of:

(d) determining whether the second reverse link noise level associated with the second reverse radio link of the plurality of reverse links of the second type of the plurality of transmission technologies exceeds the second reverse link noise threshold associated with the plurality of reverse links of the second type of the plurality of transmission technologies, or whether the second channel element of the second type of the plurality of transmission technologies is unavailable;

(e) determining whether the first reverse link noise level associated with the first reverse link of said plurality of reverse links of the first type of the plurality of transmission technologies is below the first reverse link noise threshold associated with the plurality of reverse links of the first type of the plurality of transmission technologies, and whether the first channel element of the first type of the plurality of transmission technologies is available;

(f) performing, if the determining in the steps (d) and (e) are positive, at least one of:

(f1) removing a plurality of active radio links of the second type of the plurality of transmission technologies from an active set associated with the second type of the plurality of transmission technologies, and handing-off the removed plurality of active radio links of the second type to the first type of radio links of the plurality of transmission technologies, and (f2) reducing power level of at least one of the plurality of reverse and forward radio links associated with the second type of the plurality of transmission technologies;

repeating the step (a) if the determining in the step (d) or (e) is negative, and following at least one of the steps (f1) and (f2).

22. The method as recited in claim 20 wherein said step (d) follows one of either steps (a) and (b) when either one of the steps (a) and (b) is negative.

23. In a communication system providing communication services between a plurality of mobile stations and a base station through a plurality of radio links including a plurality of forward radio links and a plurality of reverse radio links transmitted according to a plurality of compatible radio transmission technologies, and said base station having a limited radio link capacity of each of said plurality of compatible radio transmission technologies, a method for controlling said limited radio link capacity of each of said plurality of compatible radio transmission technologies comprising the steps of:

(a) determining whether a first reverse link noise level associated with a first reverse link of said plurality of reverse links of a first type of the plurality of transmission technologies is below a first reverse link noise threshold associated with the plurality of reverse links of the first type of the plurality of transmission technologies, and whether a first channel element of the first type of the plurality of transmission technologies is available;

(b) determining whether a second reverse link noise level associated with a second reverse radio link of the plurality of reverse links of a second type of the plurality of transmission technologies exceeds a second reverse link noise threshold associated with the plurality of reverse links of the second type of the plurality of transmission technologies, or whether a second channel element of the second type of the plurality of transmission technologies is unavailable;

(c) performing, if the determining in the steps (a) and (b) are positive, at least one of:

(c1) removing a plurality of active radio links of the second type of the plurality of transmission technologies from an active set associated with the second type of the plurality of transmission technologies, and handing-off the removed plurality of active radio links of the second type to the first type of radio links of the plurality of transmission technologies, and (c2) reducing power level of at least one of the plurality of reverse and forward radio links associated with the second type of the plurality of transmission technologies.

24. In a communication system providing communication services between a plurality of mobile stations and a base station through a plurality of radio links including a plurality of forward radio links and a plurality of reverse radio links transmitted according to a plurality of compatible radio transmission technologies, and said base station having a limited radio link capacity of each of said plurality of compatible radio transmission technologies, an apparatus comprising:

means for controlling radio link capacity of each of said plurality of compatible radio transmission technologies;

means for controlling said means for controlling radio link capacity of each of said plurality of compatible radio transmission technologies based on a quality metric report including information about a quality of radio link between at least one of said plurality of mobile stations and said base station;

means for controlling transmission power level of a radio link of said plurality of radio links, wherein said radio link transmission power level controlled by said means for controlling transmission power level is based on a communication between said means for controlling radio link capacity and said means for controlling transmission power level, wherein said communication includes information about at least one of a frame error rate threshold, symbol error rate threshold, and noise rise of said radio link, and wherein an adjustment of said radio link transmission power level is based on at least one of a frame error rate threshold, symbol error rate threshold, and noise rise of said radio link, wherein said information in said communication between said means for controlling radio link capacity and said means for controlling transmission power level is at least in a part is based on information communicated from said means for controlling said means for controlling radio link capacity of each of said plurality of compatible radio transmission technologies, wherein said means for controlling radio link capacity of each of said plurality of compatible radio transmission technologies includes a number of independent means for controlling radio link capacity corresponding to a number of said plurality of compatible radio transmission technologies.

* * * * *